INVENTOR
Mark R. Estabrook
by Carlson, Pitzner, Hubbard & Wolfe
ATTORNEY

Oct. 3, 1961 M. R. ESTABROOK 3,002,404
CONTROL SYSTEM FOR MACHINE TOOLS
Filed May 13, 1958 5 Sheets-Sheet 2
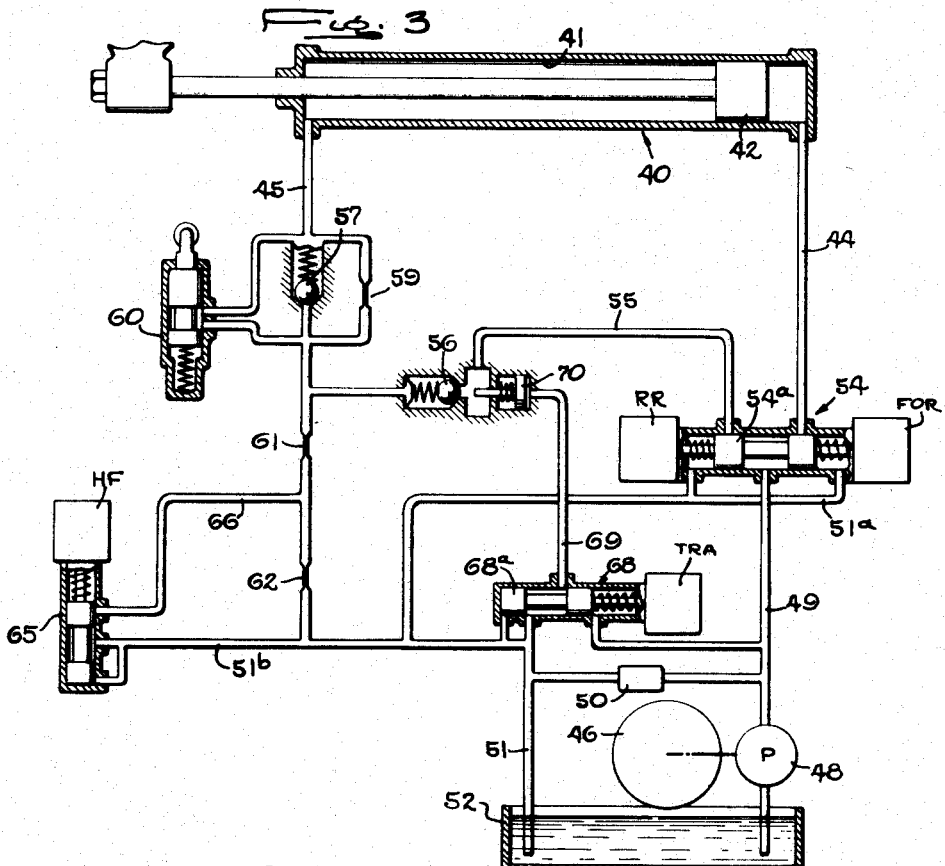
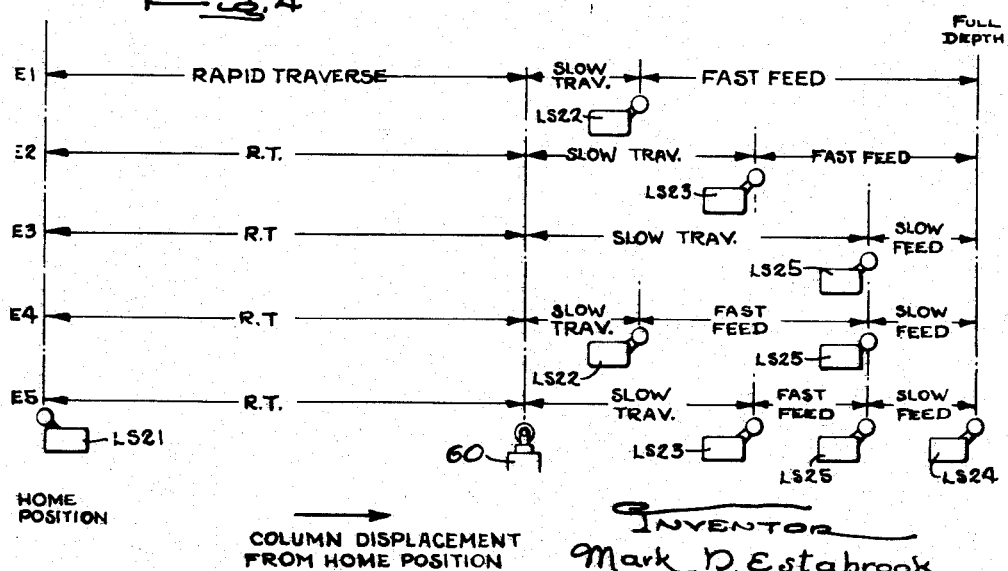

Oct. 3, 1961  M. R. ESTABROOK  3,002,404
CONTROL SYSTEM FOR MACHINE TOOLS
Filed May 13, 1958  5 Sheets-Sheet 3
Fig. 5
|   | EL | X | O | CH | 8 | 4 | 2 | 1 |
|---|----|---|---|----|---|---|---|---|
| 0 |    |   | O |    |   |   |   |   |
| 1 |    |   |   |    |   |   |   | O |
| 2 |    |   |   |    |   |   | O |   |
| 3 |    |   |   |    |   |   | O | O |
| 4 |    |   |   |    |   | O |   |   |
| 5 |    |   |   |    |   | O |   | O |
| 6 |    |   |   |    |   | O | O |   |
| 7 |    |   |   |    |   | O | O | O |
| 8 |    |   |   |    | O |   |   |   |
| 9 |    |   |   |    | O |   |   | O |
| EL | O |   |   |    |   |   |   |   |
| TABLE |  | O | O |    |   |   |   | O |
| HEAD  |  | O | O |    |   |   | O |   |
| C |    | O | O |    |   |   | O | O |
| D |    | O | O |    |   | O |   |   |
| E |    | O | O |    |   | O |   | O |
| F |    | O | O |    |   | O | O |   |
| G |    | O | O |    |   | O | O | O |
| H |    | O | O |    | O |   |   |   |
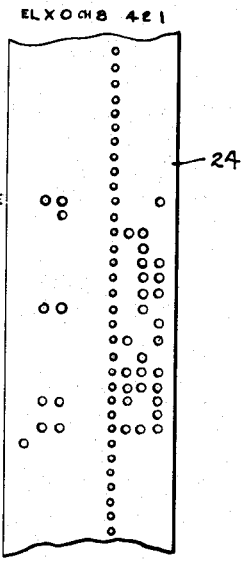
Fig. 6
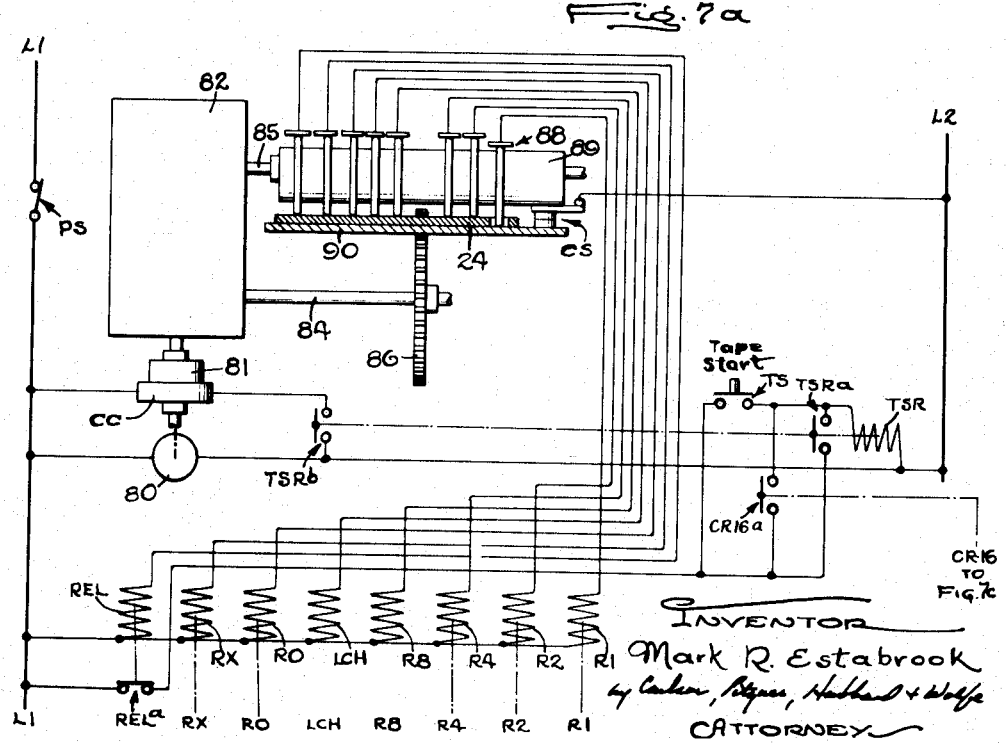
Fig. 7a Oct. 3, 1961 M. R. ESTABROOK 3,002,404
CONTROL SYSTEM FOR MACHINE TOOLS
Filed May 13, 1958 5 Sheets-Sheet 4

INVENTOR
Mark R. Estabrook
by Carlson, Pitzner, Hubbard & Wolfe
ATTORNEYS

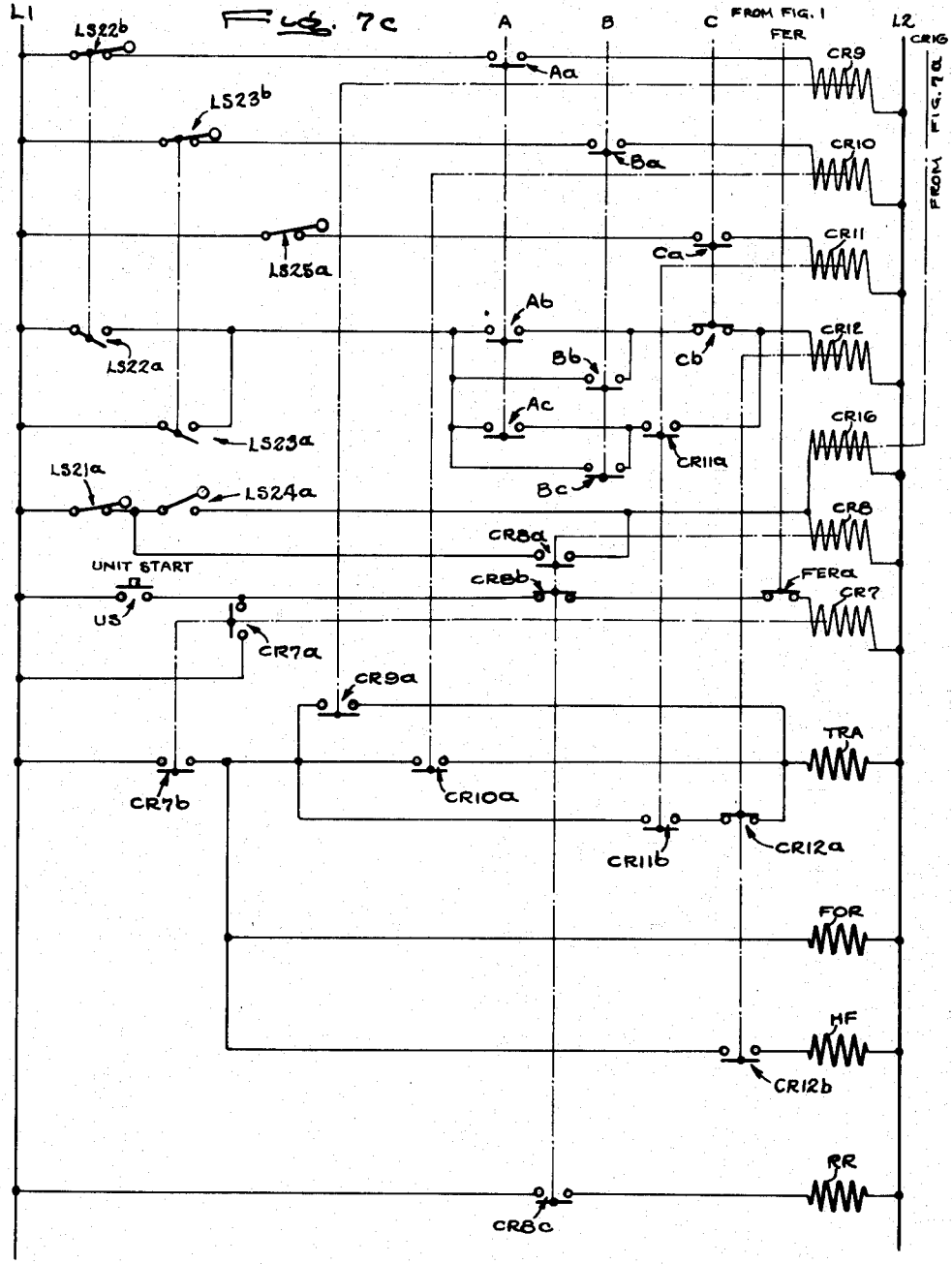

United States Patent Office 3,002,404
Patented Oct. 3, 1961

3,002,404
CONTROL SYSTEM FOR MACHINE TOOLS
Mark R. Estabrook, Rockford, Ill., assignor to Barnes Drill Co., Rockford, Ill., a corporation of Illinois
Filed May 13, 1958, Ser. No. 734,947
9 Claims. (Cl. 77—32.8)

The present invention has to do with machine tools, and is more particularly concerned with the control of the rates or velocities imparted to a movable member as it progresses through successive portions of its total range of travel. The invention finds especially advantageous but not exclusive use in drilling machines, enabling the drilling or cutting tool to be moved toward a workpiece in different programs of rapid traverse, high feed, and low feed rates over different portions of its total travel.

It is the general aim of the invention to provide a system in which a movable member, such as a drill-carrying machine tool column, can be advanced at different rates over different distances to bring the cutting tool rapidly up to the workpiece and then to feed the cutting tool at an appropriate rate into the workpiece. This reduces the time required for each machining operation, while assuring that the necessary feed rates, consistent with the materials of the cutter tool and workpiece, are created during actual cutting operations.

A coordinate object of the invention is to make possible a preselection of any one of several rate programs which will then be executed automatically by the movable member of the machine tool as the latter performs successive machining operations.

Another object of the invention is to provide a system in which coded rate program information is read from a digital record, such as punched tape, and utilized to condition control means to make a movable member execute a particular one of several possible rate programs which corresponds to the code information.

It is another object to provide an arrangement in which relatively simple and reliable control elements are respectively actuated as a movable member of a machine tool advances past successive points in its travel, such control elements being selectively rendered operative in different combinations to effect changes in the rate of the member's movement as it passes the different points.

Still another object is to realize a simple and reliable system for selectively rendering different combinations of a plurality of control elements operative to establish different ones of a plurality of rate programs for a movable element by setting storage apparatus to a unique state for each of several program codes read from a digital record, and by governing said control elements according to the state of the storage apparatus.

Other objects and advantages will become apparent as the following description proceeds, taken in conjunction with the accompanying drawings, in which:

FIG. 3 is a diagrammatic illustration of hydraulic power means and associated with controls for advancing and retracting a movable member or column of the machine tool;

FIG. 4 is a chart depicting the several rate programs which may be executed selectively by the movable member of the machine tool in response to different program codes;

FIG. 5 is a table defining punched hole codes used to represent the different numerical and alphabetical characters on a punched tape;

FIG. 6 illustrates a sample length of punched tape containing one block of instructions for the machine tool; and FIGS. 7a, 7b, and 7c, when joined along the indicated junction lines, together form a schematic wiring diagram for an exemplary control system embodying the features of the invention.

While the invention has been shown and will be described in some detail with reference to a particular embodiment thereof, there is no intention that it thus be limited to such detail. On the contrary, it is intended here to cover all modifications, alternatives, and equivalents falling within the spirit and scope of the invention as defined by the appended claims.

Figure 1:
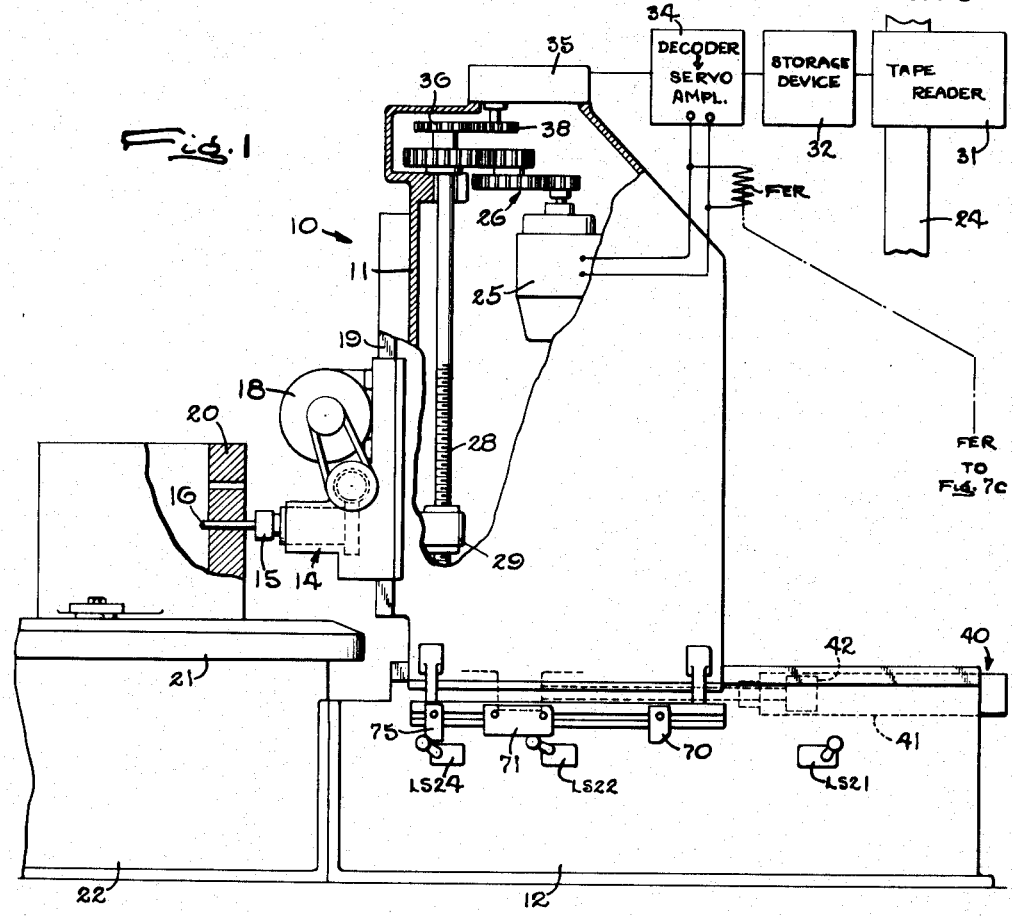
FIGURE 1 is an elevational view, partly in section, of an exemplary machine tool on which the invention is used, together with diagrammatically illustrated numerical positioning apparatus.

Referring to FIG. 1, the machine tool there shown is a horizontal drilling machine 10 which comprises a movable member or column 11 supported on, and slidable back and forth along, the ways of a bed 12. A drilling head 14 carried by the column 11 has a spindle 15 in which a cutting tool or bit 16 is chucked to be rotatably driven through appropriate gearing from a spindle motor 18.

The drilling head 14 may be positioned vertically along ways 19 formed on the column 11, and the column then reciprocated toward and away from a workpiece 20 to advance the bit 16 into and out of the workpiece, thereby drilling a hole in the latter. The workpiece 20 is here shown as a cylindrical member, such as jet engine casing, in which a plurality of holes are to be drilled at certain vertically and peripherally located points. The workpiece may be supported on a table 21 which is journaled for rotation about a vertical axis on a base 22, and a motor (not shown) provided to drive the table successively to various predetermined angular positions relative to the drill bit 16.

In the present machine, the drill head 14 is automatically moved to successive vertical positions which are defined in the first instance by numerical information recorded in digital form on a record device, such as a punched paper tape 24. For moving the head 14 from one vertical position to another, a reversible elevating motor 25 is drivingly connected through gearing 26 to a lead screw 28 cooperatively engaged by a nut 29 rigidly fixed to the head 14. As the motor is energized to drive the elevating screw in one direction or the other, the head 14 will be raised or lowered.

The punched tape 24 is shown in more detail by FIG. 6, and is divided into eight longitudinal columns designated EL, X, 0, CH, 8, 4, 2, and 1. By the presence of holes punched in a horizontal row across the tape in different combinations of the eight columns, any of a plurality of numerical or alphabetical characters can be represented by that row. The coding of holes in different columns to represent any one of the characters 0–9, EL, Table, Head, and C through H is listed in FIG. 5.

One block of information supplied to the machine tool for a given machining operation is illustrated by the punched holes appearing in the tape of FIG. 6. As there shown, the first seven rows of holes read "Table 062333" and thus designate the angular position which the table 21 is to have, measured from a reference point on the circumference of a circle of 60 inches diameter concentric with the axis of the table. These first seven rows of coded information when sensed by a tape reader are utilized, by means not shown, to move the table 21 to the desired angular position, thereby determining the peripheral location of a hole which will be drilled in the workpiece.

The next six rows of holes in the tape 24 read "Head 16277" and designate that the drilling head 14 is to be moved to a vertical position which is 16.277 inches from a reference position along the ways 19 of the column 11.

To utilize this information in positioning of the head 14, the punched tape 24 is read, one block at a time, by a tape reader 31 (FIG. 1). The information corresponding to these six rows of punched holes designating the desired head position is fed to a storage device 32. This storage device supplies appropriate signals to a decoder and servo amplifier 34 which in turn energizes the motor 25, causing the latter to drive the lead screw 28 and move the head 14 toward the desired vertical position.

The angular rotation of the lead screw 28, and thus the vertical position of the head 14, is electrically represented by one or more selsyn devices 35 which have their rotors driven from the lead screw through gears 36 and 38. The selsyn devices form, in well known manner, a feedback link to the decoder and servo amplifier 34, so that the latter supplies a D.C. output voltage to the motor 25 which is proportional in magnitude to the positional error of the head 14, and which is of a polarity which agrees with the sense of that error. As the head 14 approaches the desired position represented by the numerical information held in the storage device 32, the feedback from the selsyn devices 35 will cause the output voltage of the servo amplifier to be gradually reduced. When the head 14 reaches exactly the desired position, the output signal from the servo amplifier 34 will be reduced to zero, and the motor 25 de-energized to bring the head 14 to a stop.

For a purpose which will become apparent, a fine error relay FER is connected across the output terminals of the servo amplifier 34. Whenever the head 14 is not halted in a vertical position which corresponds to the numerical information held in the storage device 32, the output signal from the servo amplifier 34 will be appreciable, and the relay FER will be picked up. On the other hand, as the drill head 14 reaches the desired vertical position, and the output signal of the servo amplifier 34 is reduced substantially to zero, the relay FER will be de-actuated.

The tape reader 31 will read one block of information at a time from the punched tape 24, the end of a block being designated on the tape by the code line EL. When the reader senses this last line, its operation is terminated, so that the head 14 is then moved to the desired vertical position, where it remains until the drilling of a hole is completed. After that, the tape reader is again actuated to read the next block of information and cause movement of the head 14 to the next vertical position.

After the head 14 has been stopped in each of its desired vertical positions, the column 11 is advanced and retracted to cause the bit 16 to drill a hole at a particular vertical location in the workpiece 20. Desirably, the initial movement of the column from its retracted or home position is at a rapid rate so that the drill bit is brought almost into engagement with the workpiece 20 in a minimum of time. Following that, the movement of the column 11 must be at a slower or feed rate as the bit enters the work and cutting begins.

For creating such movements, power means are employed which can shift the column 11 toward the workpiece 20 at any one of a number of different speeds or rates, and which can rapidly retract the column from its fully advanced position to its retracted or home position. As here shown, such power means take the form of a double-acting hydraulic actuator 40 made up of a cylinder 41 fixed to the bed 12 and having a piston 42 slidable therein and connected with the column 11. Conduits 44 and 45 (FIG. 3) connect with the right and left ends of the cylinder, respectively. As a source of fluid pressure, a motor 46 continuously drives a pump 48 which supplies fluid to a conduit 49, the output pressure of the pump being held constant by a relief valve 50 leading back through a return conduit 51 to a fluid sump 52.

For controlling the direction of column movement, a four-way valve 54 having a spring-centered plunger 54a slidable in a ported casing is interposed between the pump outlet 49 and the return conduit 51, on the one hand, and the cylinder conduits 44 and 45 on the other hand. It will be apparent from FIG. 3 that when the valve plunger 54a is shifted to the left in response to energization of an associated rapid return solenoid RR, the pressure fluid conduit 49 will be connected through a conduit 55, a first check valve 56, a second check valve 57, and the conduit 45 to the left end of the cylinder 41. At the same time, the right end of the cylinder 41 will be connected through the conduit 44, the valve 54, the conduit 51a and the return conduit 51 to the sump 52. With this, the piston 42 will be forced to move rapidly to the right (FIG. 3), retracting the column 11 from an advanced position back toward its home position at the right end of the bed 12 (FIG. 1).

It will be observed that the two check valves 56 and 57 let fluid pass freely in the direction from the conduit 55 into the conduit 45, while they will not normally permit fluid flow in the opposite direction.

When the valve plunger 54a is shifted to the right (FIG. 3) in response to energization of an associated forward solenoid FOR, the conduit 49 will be connected with the conduit 44 to cause pressure fluid to flow into the right end of the cylinder 41. With this, fluid from the left end of the cylinder 41 may return to the sump 52 by passing through the conduit 45, a first large orifice 59 (assuming a normally open valve 60 to be closed), a second coarse restricting orifice 61, and a third fine restricting orifice 62 which leads to the return conduit 51. This fluid return path will include the three orifices 59, 61 and 62 in series so that the rate at which fluid can be emptied from the left end of the cylinder 41 is limited by the finest orifice 62. Accordingly, the piston 42 will be moved to the left (FIG. 3), thereby advancing the column 11 toward the workpiece 20 (FIG. 1) but at a relatively slow or low feed rate. Thus, energization of the forward solenoid FOR by itself will cause the column 11 to be advanced at a slow feed rate which is determined by the narrow orifice 62.

In order to cause the hydraulic actuator 40 to move the column 11 forwardly at any of a number of different rates, a plurality of electrical devices here shown as valves having actuating solenoids are employed in the hydraulic circuit associated with the cylinder 41. If it is desired to move the column 11 at a higher feed rate, that may be accomplished by energizing a high feed solenoid HF which is associated with a normally closed valve 65. Energization of the solenoid HF and opening of the valve 65 results in communication between conduits 66 at 51b, so that fluid can return to the sump 52 from the left end of the cylinder 41, by-passing the fine orifice 62. The coarse orifice 61 now determines the rate of fluid flow from the cylinder 41 to the sump 52. As a result of this, the column's rate of movement or velocity will be greater, and may be designated as a "high feed rate."

Assuming the valve 60 to be actuated and closed, the column 11 may be made to advance at a slow traverse rate in response to actuation of a traverse solenoid TRA which results in fluid returning from the left end of the cylinder 41 by-passing the coarse orifice 61. To effect this, the check valve 56 is disabled so that fluid can pass reversely therethrough. Fluid then returns from the left end of the cylinder 41 through the conduit 45, the slow traverse orifice 59, the valve 56, the conduit 55, the valve 54, the conduit 51a and the conduit 51, to the sump 52. Since the only restriction in this return path is the orifice 59, the column will be advanced fairly rapidly or at a rate which has here been termed "slow traverse."

This "slow traverse" velocity is caused, as noted above, by disabling the check valve 56 so that fluid can flow reversely therethrough. This is accomplished in response to energization of the traverse solenoid TRA which is associated with a valve 68 having a spring-biased plunger 68a movable in a ported casing and normally connecting a conduit 69 to the fluid return conduit 51. Normally, the valve 68 vents fluid from the left side of an actuator piston 70 so that its piston rod is retracted away from the spring-seated ball of the check valve 56. However, when the traverse solenoid TRA is energized and the plunger 68a shifted to the right, then pressure fluid from the conduit 48 is passed through the conduit 69 to the right side of the piston 70. This shifts the piston 70 to the left so that the rod which it carries engages and unseats the ball of the check valve 56. In this manner, the check valve 56 is disabled so that fluid may pass from the left end of the cylinder 41 freely therethrough to reach the sump 52.

To produce movement of the column 11 in a forward direction at a rapid traverse rate, the forward and traverse solenoids FOR and TRA are both energized, and the valve 60 left de-actuated (open). With this, the check valve 56 is disabled as previously explained, while the valve 60 creates a by-pass path around the slow traverse orifice 59. Thus, with fluid pressure supplied through the valve 54 and the conduit 44 to the right end of the cylinder 41, and with the left end of the cylinder 41 communicating with the sump 52 through the conduit 45, the valve 60, the valve 56, the conduit 55, the valve 54, and the conduits 51a and 51, the piston 42 can advance rapidly to the left, thereby moving the column 11 toward the workpiece at a rapid traverse rate.

With the foregoing in mind, the following table of the different directions and rates of column motion which are produced in response to energization or actuation of the various solenoids and valves will be helpful:

| Actuated Components | Column Motion | | Effective Orifice |
|---|---|---|---|
| | Direction | Rate | |
| RR | Return | Rapid Traverse | None |
| FOR  TRA | } Forward | do | None |
| FOR  TRA  Valve 60 | } do | Slow Traverse | 59 |
| FOR  Valve 60  HF | } do | High Feed | 61 |
| FOR  Valve 60 | } do | Slow Feed | 62 |

In order to detect when the column 11 passes through certain points spaced successively along its path of motion, a plurality of control elements or switching means are employed, together with means for actuating each of those elements as the column passes through a respectively different point in its travel. As shown in FIG. 1, a first limit switch LS21 is mounted on the bed 12 and cooperatively disposed to be actuated by a dog 70 carried by a bracket depending from the column 11. When the column 11 is fully retracted to its home position at the right end of the bed 12, the dog 70 will actuate the limit switch LS21, and thereby cause its normally closed contacts LS21a (FIG. 7c) to be opened. The limit switch LS21 may thus be considered as the "home" limit switch.

As the column advances a first predetermined distance toward the left from its home position, a limit switch LS22 (FIG. 1) mounted on the bed 12 will be actuated by a dog 71 carried by the bracket depending from the column 11. With such actuation of the switch LS22, its normally closed contacts LS22b and its normally open contacts LS22a will be respectively opened and closed (FIG. 7c).

As the column 11 advances still further toward the workpiece 20, another control element or limit switch LS23 (FIG. 2) mounted on the bed 12 will be engaged and actuated by a dog 72 carried on a column bracket. With such actuation of the switch LS23, its normally closed contacts LS23b and its normally open contacts LS23a will be respectively opened and closed (FIG. 7c).

As the column moves still further, another limit switch LS25 (FIG. 2) will be engaged and actuated by a dog 74 carried on a column bracket. With this, the normally closed contacts LS25a (FIG. 7c) will be opened.

Finally, when the column reaches the end of its forward movement as shown in FIG. 1, i.e., the drill bit 16 has drilled a hole to the desired full depth in the workpiece 20, then a limit switch LS24 mounted on the bed 12 will be actuated by a dog 75. Such actuation of the limit switch LS24 will result in closure of its normally open contacts LS24a (FIG. 7c). This latter limit switch may be termed the "full depth" switch.

Figure 2:
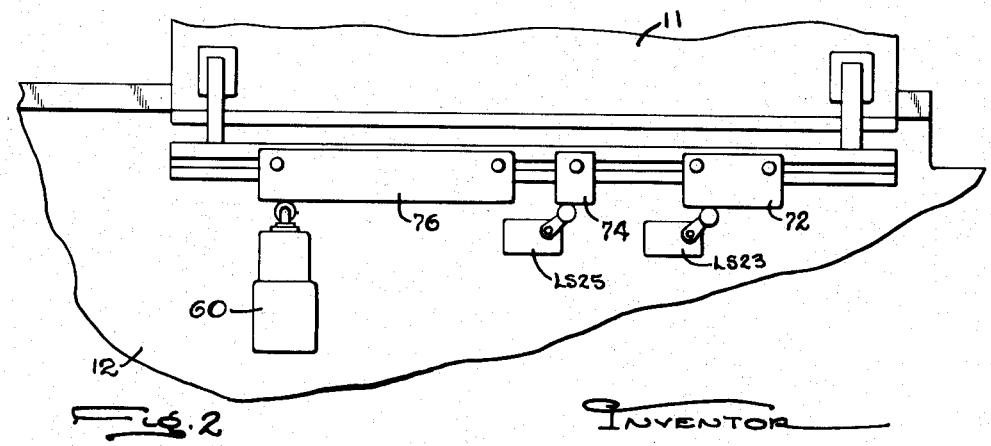
FIG. 2 is a fragmentary detail view of control elements and means for actuating the same.

It will be understood from FIGS. 1 and 2 that the limit switches LS23 and LS25 are offset physically behind the limit switches LS21, LS22 and LS24 in FIG. 1. Nevertheless, when the column 11 is fully retracted to its home position the limit switch LS21 will be actuated; then, as the column advances toward the workpiece the limit switches LS22, LS23, LS25 and LS24 will be actuated in the order named as the column passes through successively spaced apart predetermined points, the last of which is the point of farthest advance.

The mechanically actuated valve 60 (FIG. 3) is utilized as a deceleration valve, that is, to convert the rapid traverse rate of column movement to a slower traverse rate before feeding begins in order that an abrupt change of column speed is not required just before the drill bit 16 begins to enter the workpiece. This deceleration valve 60 may be mounted on the bed 12 as shown in FIG. 2 and disposed opposite a dog 76 which actuates the valve after the column has traversed forwardly through a predetermined distance from its home position. The use of the deceleration valve 60 results, therefore, in the initial forward motion of the column being at a relatively high rapid traverse rate, and in that motion being reduced to a slow traverse rate at a predetermined point in the column's forward travel. The dog 76 as shown in FIG. 2 is arranged to actuate the valve 60 before the limit switch LS22 (FIG. 1) is actuated by the dog 71.

It is to be observed from FIG. 3 that only two electrical devices or solenoid valves 65 and 68 are employed to change or determine the rate of column motion. However, it will be apparent from FIGS. 1 and 2 that a total of three control elements or limit switches LS22, LS23 and LS25 are disposed at successive points along the path of column movement.

In accordance with the present invention, means are provided to connect the control elements or limit switches LS22, LS23 and LS25 in different effective controlling relationships with the electrical devices which govern the speed with which the power means advance the column 11. In this manner it is possible to create any one of a plurality of different combinations of column velocities or rates over different intervals of its forward travel.

As shown in FIG. 4, a total of five different motion programs are here made available. The first line of FIG. 4 indicates that the first motion program is designated by a code "E1." It will be seen that when this program is followed, the column is advanced at rapid traverse rate until the dog 76 actuates the deceleration valve 60. Then the column slows to a slow traverse rate until the dog 71 actuates the limit switch LS22. Following that, the column moves at a high feed rate until it reaches the full depth position.

The second motion program designated by a code "E2" consists of rapid advance of the column until the deceleration valve 60 is actuated, then slow traverse of the column until the limit switch LS23 is actuated, followed by a high feed rate until the column reaches its full depth.

A third motion program, illustrated by FIG. 4, and designated by the code "E3," consists of rapid traverse of the column until the deceleration valve 60 is actuated, then slow traverse of the column until the switch LS25 is actuated, and finally a slow feed rate until the column reaches its full depth position.

The fourth motion program, depicted by FIG. 4 and designated by the code "E4," consists of rapid traverse of the column until the valve 60 is actuated, then slow traverse of the column until the limit switch LS22 is actuated, then a high feed rate until the limit switch LS25 is actuated, followed by a slow feed rate until the column reaches its full depth position.

The fifth motion program designated by the code "E5" consists of rapid traverse until the deceleration valve 60 is actuated, then slow traverse until the limit switch LS23 is actuated, then a high feed rate until the limit switch LS25 is actuated, and then a slow feed rate until the column reaches its full depth position at which the limit switch LS24 is actuated.

During the "E1" motion program the limit switches LS23 and LS25 have no effect whatever as they are actuated. On the other hand, during the motion program "E2," the actuation of the limit switches LS22 and LS25 produces no effect. In like manner, during the motion program "E3," limit switches LS22 and LS23 produce no change in column rate when they are actuated. During execution of the motion program "E4," actuation of limit switch LS23 has no effect, while during execution of the motion program "E5" actuation of the limit switch LS23 has no effect.

By making it possible to preselect any one of the five motion programs for the column 11 as depicted in FIG. 4, a very flexible arrangement is achieved which permits the distances of traversing and feeding, as well as the magnitudes of feed rates, to be changed. This is advantageous where a drilling machine is to be utilized in drilling holes and counterboring on differently sized workpieces of different materials, and with cutter bits of different lengths and materials.

In accordance with the present invention it is not only possible with the power means and the electrical solenoid valves for controlling it (FIG. 3) and the plural switching elements or limit switches (FIGS. 1 and 2) to cause the machine tool to execute any one of the five motion programs depicted by FIG. 4, but it also possible to preselect any one of those motion programs to take place during each successive drilling operation in response to binary coded information read from the punched tape 24. To accomplish this, the code symbols for any one of the several motion programs are placed on the punched paper tape in each block of numerical information applied thereto. Decoding means responsive to those motion program codes are provided and so connected as to set storage apparatus to a unique state in response to each of the possible codes which are read. Finally, the storage apparatus is so arranged that, according to its particular state, it will effectively interconnect different ones of the control elements or limit switches in controlling relationship with the electrical devices or solenoid valves which govern the hydraulic power means of FIG. 3.

The foregoing may be more clearly understood in the light of the following detailed description with reference to FIGS. 7a, b and c.

Figure 7B:
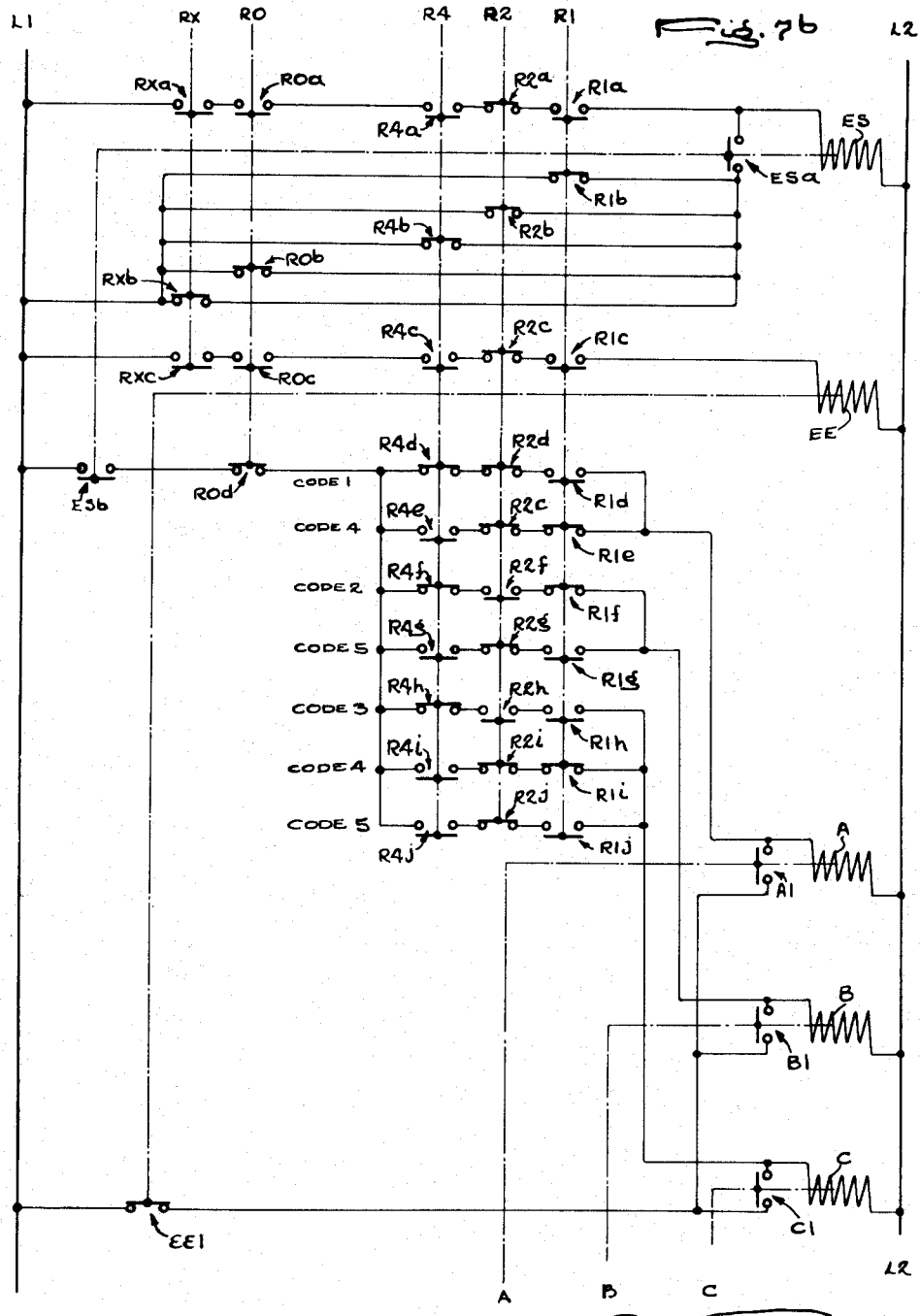

The storage apparatus which is here employed comprises three relays A, B and C having their coils connected in circuit as shown in FIG. 7b. These three relays are energized in a unique combination in response to reading of each of the five possible motion program codes from the punched paper tape 24. The manner in which this is done will be detailed below, but for the present it will be helpful to tabulate the particular combinations of the relays A, B and C which are energized in response to reading of the five possible program codes:

| Program code: | Storage apparatus state (relays energized) |
|---|---|
| E1 | A |
| E2 | B |
| E3 | C |
| E4 | A+C |
| E5 | B+C |

Whenever it is desired for the machine tool column 11 to execute a particular one of the several available motion programs, an appropriate code will be placed on the punched paper tape 24 (FIG. 6). This code will consist of a row of holes representing the alphabetical character "E" followed by a row of holes which represents one of the numerical characters 1 through 5. As shown in FIG. 6, the third and fourth rows from the end block designate the code "E1." Perhaps the next block of punched information on the tape 24 would contain two successive lines designating the motion program code "E3" or "E4" or any particular code which may be desired.

The manner in which this code information from the paper tape is sensed and utilized will now be explained with reference to FIGS. 7a, b and c.

As shown diagrammaticaly in FIG. 7a, the punched tape reader 31 includes a motor 80 which may be assumed to be continuously energized by connection across the voltage supply lines L1, L2. This motor is drivingly connected through a clutch 81, engaged in response to energization of an electromagnetic clutch coil CC, to a transmission mechanism 82 having output shafts 84 and 85.

Whenever the clutch 81 is engaged, the output shaft 84 is rotated in intermittent steps so that a sprocket wheel 86 engaged with the sprocket holes of the punched tape 24 will advance that tape one row at a time past a plurality of contact fingers 88 alined with the eight respective longitudinal tape columns. The output shaft 85 of the transmission 82 is continuously rotated as long as the clutch 81 is engaged. This shaft carries a cam 89 which is so shaped as to lower each of the contact fingers 88 for an instant during the time interval that the tape remains stationary therebeneath. Those particular ones of the contact fingers 88 which lie above holes in the particular row of the tape being sensed will project through those holes to electrically contact a conductive plate 90. The eight contact fingers are each connected in circuit with a corresponding one of eight relays from the voltage supply line L1, the plate 90, and a cam switch CS to the line L2. Thus, whatever combination of holes appears in a given row of the tape 24 will result in completion of circuits by the corresponding combination of contact fingers to pick-up the corresponding combination of relays.

The eight relays shown in FIG 7a have been identified by reference characters corresponding to symbols assigned to the eight respective columns of the punched tape 24, except for the distinguishing prefix "R." As an example of the tape reader operation, if a given row of holes in the punched tape 24 contains holes in columns X, 0, 4, 2 and 1 (to designate the alphabetical character "G," see FIG. 5) then when that row of holes is read, the corresponding contact fingers 88 will electrically engage the conductive plate 90, and upon closure of the cam switch CS, corresponding relays RX, R0, R4, R2 and R1 will be simultaneously and momentarily energized. The cam switch CS is momentarily closed by the cam 89, and it is arranged to close slightly after all of the contact fingers have been lowered to either engage the punched tape 24 or pass through holes therein. In this manner, all of the relays in the particular combination to be energized will be picked up simultaneously.

In order to sense when a motion program code appears on the punched tape 24, and to set the storage apparatus in the corresponding unique state, decoding means such as those exemplified in FIG. 7b are employed. As a first part of such decoding means, an E storage relay ES is connected across the voltage supply lines L1, L2 through normally open contacts RXa, R0a, R4a, R1a, and the normally closed contacts R2a. Referring to FIG. 5, it will be seen that an "E" row of holes in the punched paper tape will include holes in columns X, 0, 4 and 1. Whenever such an "E" row is read from the tape by the contact fingers 88, the four relays RX, R0, R4 and R1 will all be simultaneously and momentarily energized. With this, an energization circuit for the "E" storage relay will be established, and the latter will pick up, closing its normally open sealing contacts ESa. The contacts ESa establish a sealing circuit for the relay ES through the parallel combination of contacts RXb, R0b, R4b, R2b and R1b, all of which are normally closed. Whenever the first line of a motion program code, i.e., "E" is read from the tape, therefore, the "E" storage relay ES will be picked up and sealed in. This will result also in closure of its normally open contacts ESb, thereby partially completing a circuit for the storage apparatus relays A, B and C.

After the "E" storage relay has been energized, the next line read by the contact fingers from the punched paper tape will be a code representing one of the numbers 1–5. Whenever any one of these five numbers is read from the punched paper tape, the relay R0 will be left de-energized, so that the normally closed contacts R0d in series with contacts ESb will remain closed. If that numerical code line represents "1," a "code 1" conduction path (FIG. 7b) will be completed by momentary closure of the normally open contacts R1d. This will result in energization of the relay A.

If the numerical code line represents the number "2," then a "code 2" conduction path (FIG. 7b) will be completed by momentary closure of contacts R2f, resulting in energization of relay B. If the numerical code line represents "3," the conductive path marked "code 3" in FIG. 7b will be completed by momentary and simultaneous closure of contacts R1h and R2h, thereby energizing the relay C.

Still further, after an E code line has been read to close the contacts ESb, reading of a numerical code line representing "4" will complete the two conductive paths marked "code 4" in FIG. 7b. With this, both the relays A and C will be energized. Finally, if the numerical code line following an E code line is for the numeral "5," both of the conductive paths marked "code 5" in FIG. 7b will be completed by momentary and simultaneous closure of the contacts R4g, R4j and R1g, R1j, thereby energizing both of the relays B and C.

It will be apparent, therefore, that whenever the codes E1, E2, E3, E4, or E5 are read from the punched paper tape 24, they will be decoded and result in energization of the three storage relays in the respective combinations A, B, C, A+C, and B+C.

Upon momentary energization of any combination (one or more) of the storage relays A, B and C, those which are picked up will be sealed in through their own normally open contacts A1, B1, or C1 and normally closed contacts EE1 controlled by an "E erase" relay EE.

Once the three relays A, B and C have been energized, and sealed in, in a particular one of the five combinations noted above, then the next row which will be read from the punched paper tape 24 will be a "G" code, as shown in the next to the last row of holes for the punched paper tape of FIG. 6. It will be seen that this G code line contains holes in columns X, 0, 4, 2 and 1. Thus, when this G code line is read, the relays RX, R0, R4, R2 and R1 will all be momentarily energized, resulting in simultaneous momentary opening of contacts RXb, R0b, R4b, R2b and R1b (FIG. 7b), thereby unsealing and dropping out the E storage relay ES. With this, the contacts ESb open to break the connection from line L1 through the contact matrix to the relays A, B and C. Further reading of numerical codes, therefore, cannot affect the energization pattern of these three storage relays. Reading of a G code cannot affect the relay EE, because the contacts R2c in series therewith will be opened when the other series contacts close. Moreover, the normally closed contacts R2a will open when a G code is read to make certain the ES relay drops out, even though contacts RXa, R0a, R4a and R1a all simultaneously close.

When the three storage relays A, B and C have been set to a particular combination in response to reading of a motion program code, they will remain energized in that unique combination until another motion program code is read. When the next motion program code is sensed, an E code line will first be read and this will result in simultaneous energization of the relays RX, R0, R4 and R1. The contacts RXc, R0c, R4c, and R1c will all be simultaneously and momentarily closed to complete an energization path for the "E erase" relay EE. This will open the normally closed contacts EE1, and drop out those particular ones of the storage relays A, B and C which were previously energized. Such reading of a second E code line will also re-energize the E storage relay ES.

The storage apparatus relays A, B and C have contacts which appear in the control circuits of FIG. 7c. It will be apparent that if the A relay is energized and sealed-in in response to the reading of an E1 or an E4 code, then its contacts Aa, Ab and Ac will all be closed. In like manner, if the relay B has been energized in response to the reading of an E2 or an E5 code, its relay contacts Ba, Bb and Bc will all be closed. Finally, if the C relay has been energized in response to reading of an E3, E4 or E5 code, its contacts Ca will be closed, while its normally closed contacts Cb will be opened.

With the foregoing in mind, a complete cycle of operation may now be described in narrative form. Assume first that the column 11 is in its fully retracted or home position so that the limit switch LS21 is actuated and its contacts LS21a (FIG. 7c) are open. The remaining four limit switches LS22, LS23, LS24 and LS25 are all de-actuated. All of the relays and solenoids in FIGS. 7a–c are de-energized.

The operator will first close a power switch PS (FIG. 7a) to complete the connection of a suitable voltage source (not shown) to the supply lines L1 and L2. With this, the tape reader motor 80 will be started but the clutch 81 will be disengaged because the clutch coil CC is de-energized. The punched tape 24 will have been threaded in the tape reader 31, with the first block of numerical information about to enter beneath the contact fingers 88.

To start the punched tape reader 31, the operator will momentarily depress a normally open tape start switch TS, thereby completing an energization circuit for a tape start relay TSR through normally closed contacts RELa. The relay TSR will seal in through its own contacts TSRa, and will close its contacts TSRb to complete an energization circuit for the clutch coil CC. Accordingly, the clutch 31 will be engaged and the tape 24 will be advanced one row at a time past the contact fingers 88. These contact fingers will result in successive energizations of the eight corresponding relays in different combinations according to the numerical information represented by successive rows of holes in the punched tape 24. The numerical information designating the desired position of the drill head 14 will be supplied to storage device 32 (FIG. 1) and will cause the servo amplifier 34 to energize the motor 25, thereby driving the drill head 14 to the desired vertical position. The relay FER will be energized until the head reaches the desired position and comes to a halt when the output signal of the servo amplifier 34 is reduced substantially to zero.

As the tape reader continues to read successive lines from the tape 24, it will sense the E code line (FIG. 6) and the relays RX, R0, R4 and R1 will be momentarily energized to pick up and seal in the E storage relay ES, as previously described. Then as the tape reader senses the next numerical code line, assumed to be "1," the contacts R1d will close to pick up and seal in the relay A, as previously described. Following that, the tape reader will read a code line "G" resulting in the ES relay being dropped out and the contacts ESb opened to prevent the storage relays A, B and C from being affected by subsequent reading of numbers appearing later on the punched tape. With the assumption that motion program code "E1" has been read from the punched tape, the relay A alone will be picked up and sealed in through contacts Aa and EE1.

When the punched tape reader gets to the end of one block of information and reads the end-of-block code EL, the relay REL will be momentarily energized (FIG. 7a), opening the contacts RELa. This will result in de-energization of the tape start relay TSR, so that its contacts TSRb will open to de-energize the clutch coil CC, and thereby terminate the operation of the tape reader.

The motor 25 is now energized from the servo amplifier 34 and is driving the drill head 14 toward the position designated by numerical information read into the storage device from the first block of the punched tape 24. When the drill head stops in the desired position and the output signal of the servo amplifier 34 is reduced to zero, the relay FER will be de-energized. When this occurs, the normally closed contacts FERa will close (FIG. 7c), preparing an energization circuit for a control relay CR7. The machine is now ready to begin its actual working operation.

To start the machine in operation, the operator momentarily depresses a unit start switch US (FIG. 7c), thereby energizing the relay CR7 through the normally closed contacts CR8b and FERa. The relay CR7 will pick up and seal in through its own normally open contacts CR7a, and will close the contacts CR7b. The latter contacts immediately, energize the forward solenoid FOR, so that the column 11 begins advancing from its home position.

Recalling that in response to a reading of the E1 code, the relay A has been picked up and sealed in, it will be seen from FIG. 7c that a control relay CR9 has been energized through the normally closed limit switch LS22b and the now closed relay contacts Aa. Accordingly, the contacts CR9a are also closed at this time, so that in response to the closure of contacts CR7b, the traverse solenoid TRA is also energized.

With both the FOR and TRA solenoids energized the column 11 begins its initial advancing movement at a rapid traverse rate, as previously described in connection with FIG. 3. This corresponds to the initial part of the program motion shown for the line E1 in FIG. 4.

When the column 11 advances a predetermined distance so that the dog 76 actuates the valve 60, the orifice 59 (FIG. 3) will no longer be by-passed and the column will decelerate to a slow traverse rate.

Then, when the column reaches that point at which the dog 71 actuates the limit switch LS22 (FIG. 1), the contacts LS22a will open to drop out the relay CR9, thereby opening the contact CR9a and de-energizing the traverse solenoid TRA. However, at the same instant, the normally open contacts LS22a close, thereby completing a circuit through the now closed relay contacts Ab and the normally closed contacts Cb to energize a control relay CR12. The normally open contacts CR12b of the latter relay thus close to energize the high feed solenoid HF. Accordingly, the rate of movement of the column 11 is converted from the slow traverse value to the high feed value.

As the column continues to advance at its high feed rate, the limit switch LS23 will be actuated. The opening of the contacts LS23 will have no effect, however, because the relay CR10 was not previously energized. As the column advances further, the limit switch LS25 will be actuated to open its contacts LS25a. This will have no effect on a relay CR11, however, because the contacts Ca have been previously open.

Finally, when the column reaches its full depth position, the limit switch LS24 will be actuated to close the contacts LS24a (FIG. 7). Since the contacts LS21a were deactuated when the column departed from its home position, this completes a circuit for a control relay CR8. The latter relay picks up and seals in through its own contacts CR8a. In addition, its contacts CR8b open to drop out the relay CR7, which opens the contacts CR7b and de-energizes both the forward and high feed solenoids FOR and HF. The forward motion of the column is immediately halted. In addition, pick-up of the relay CR8 results in closure of its contacts CR8c, which energizes the rapid return relay RR. With this, the power means shown in FIG. 3 is conditioned to rapidly return the column 11 to the right toward its home position. One cycle of drilling operation has, therefore, been completed.

At the instant that the relay CR8 was energized in response to the column 11 reaching its full depth position, another control relay CR16 connected in parallel therewith was also energized. This resulted in closure of the normally open contacts CR16a (FIG. 7a) to energize the tape start relay TSR. Accordingly, pick-up of that relay closes its contacts TSRb to energize the reader clutch coil CC. With this, the clutch 81 is engaged to initiate the reading of the next block of information from the punched tape 24. This reading of the second block of information from the punched tape 24 occurs during the interval that the column 11 is being retracted to its home position.

Reading of the second block of information results in the storage of a different set of numerical data in the storage device 32 (FIG. 1), thereby causing the servo amplifier 34 to generate an output signal which energizes the motor 25 to drive the drill head 14 to a second, desired vertical position. As long as this positioning is taking place, the fine error relay FER will be energized and its contacts FERa (FIG. 7c) will be opened.

Let it be assumed that the second block of information on the punched tape 24 contains two code lines designating a column motion program E2. When the E line is read by the punched tape reader 31, the E erase relay will be momentarily energized to open the contacts EE1, thereby de-energizing the relay A which was previously sealed in. Moreover, when the E code line is read, the E storage relay ES will be energized and sealed in to close the contacts ESb. When the next code line for the number 2 is read, contacts R4f and R1f will remain closed, while contacts R2f will be momentarily closed, thereby energizing the relay B, which seals in through its own contacts B1 and the now reclosed contacts EE1. When the following code line for the character "G" is read, the ES relay will be dropped out, as previously described. Thus in response to the reading of the second block of information only the relay B will be picked up and sealed in.

When the column again reaches its home position, after the first drilling operation, the limit switch LS21 will be actuated to open the contacts LS21a. This will de-energize the control relay CR8, opening the contacts CR8c to de-energize the solenoid RR, thereby bringing the column to a halt. With this, the normally closed contacts TR8b reclose and prepare the energization circuit for the control relay CR7. When the head 14 has reached the second desired position, the relay FER will be de-energized to reclose the normally closed contacts FERa. Then, the operator can again momentarily close the unit start switch US (FIG. 7c) to energize the relay CR7, thereby again closing the contacts CR7b. With this, the forward solenoid FOR will immediately be energized, as well as the traverse solenoid TRA. The latter relay is energized through the contacts CR10a which are closed as a result of energization of the control relay CR10 through the contacts LS23b and the now closed contacts Ba.

With both the solenoids FOR and TRA energized, the hydraulic power means shown in FIG. 3 will cause the column 11 to begin advancing at a rapid traverse rate from its home position. This initiates the E2 program of motion represented in FIG. 4.

When the column has advanced a predetermined distance, the deceleration valve 60 will be actuated to close, effectively connecting the orifice 59 in the hydraulic circuit of FIG. 3, thus decelerating the column to a slow traverse rate.

When the column reaches that position in which the limit switch LS22 is actuated, its rate of movement is not affected. This is so because the relay CR9 is already de-energized so that opening of the contacts LS22b has no effect. Further, closing of the contacts LS22a completes an energization circuit for the relay CR12 through the now closed contacts Bb and the normally closed contacts Cb. Pick-up of the relay CR12, and closure of the contacts CR12b results in energization of the high feed solenoid HF, thereby causing the valve 65 to open and by-pass the fine orifice 62 (FIG. 3). However, the fluid return path from the left end of the cylinder 41 is now established predominantly by the disabled check valve 56 because the solenoid TRA is still energized. Accordingly, when the limit switch LS22 is actuated and even though relay CR12 is picked up to energize the high feed solenoid HF, the column 11 continues to move at its slow traverse rate.

Then, when the column 11 reaches that position in which the limit switch LS23 is actuated, contacts LS23b open to de-energize the relay CR10. The contacts CR10a, accordingly, open to de-energize the traverse solenoid TRA, thereby letting the piston 70 (FIG. 3) reseat and close the check valve 56. With this, fluid returning from the cylinder 41 to the sump 52 must pass through the coarse orifice 61, while by-passing the fine orifice 62 through the already opened valve 65. Thus, after the limit switch LS23 has been actuated, the column will continue its advancing movement at a high feed rate as shown for the code E2 in FIG. 4.

Subsequent actuation of the limit switch 25 will have no effect, since the relay CR11 has been left de-energized by the open contacts Ca. Accordingly, the column proceeds at its high feed rate until it reaches its full depth position, where the limit switch LS24 is actuated.

With this, the direction of column motion will be reversed by energization of the rapid return solenoid RR as previously described. Moreover, the tape reader 31 will be activated to read the next block of numerical information from the punched tape 24. Let it be assumed that this third block of information contains a motion program code E3. When the code E3 is read, the previously energized relay B will be dropped out by momentary opening of the contacts EE1. Then the relay C will be energized and sealed in, as previously described. Accordingly, the contacts Ca and Cb (FIG. 7c) will be respectively closed and opened, the former causing the relay CR11 to be energized, thereby closing the contacts CR11a and CR11b.

Because none of the contacts of relays A and B are closed, the relay CR12 cannot be energized when the E3 code has been read and stored.

After the head 14 has been moved to a new position and the unit start switch US depressed to again energize the relay CR7, closure of the contacts CR7b will result immediately in energization of the forward solenoid FOR, and in energization of the traverse solenoid TRA through the now closed contacts CR11b and the normally closed contacts CR12a. With this, the column begins advancing at a rapid traverse rate from its home position.

When the column 11 reaches that position at which the dog 76 actuates the deceleration valve 60, it is decelerated to a slow traverse rate. As it continues to advance at a slow traverse rate, actuation of the limit switches LS22 and LS23 has no effect. Then, when the column 11 reaches that point at which the limit switch LS25 is actuated, the contacts LS25a open (FIG. 7c) to drop out the relay CR11. With this, the contacts CR11b open to de-energize the traverse solenoid TRA. Accordingly, only the solenoid FOR is now left energized, so that the column must continue its advancing movement at the slow feed rate, as previously described in connection with FIG. 3. The program of motion represented by the line E3 in FIG. 4 has been effected.

When the column then reaches its full depth position, the limit switch LS24 is actuated to close the contacts LS24a (FIG. 7c) thereby energizing the relay CR8 to drop out the relay CR7 and energize the rapid return solenoid RR. The column begins its rapid retracting motion, and the tape reader 31 is started to read the next block of information from the tape 24.

If now the fourth block of information should contain a motion program code E4, the relay C, previously sealed in, will be dropped out in response to reading of the E line. Also, the relay contacts ESb will be closed in response to reading of the E line. Both the relays A and C will be energized and sealed in as the following "4" line is read. The contacts Aa, Ab, Ac will be closed, while the contacts Ca and Cb will be respectively closed and opened. The relays CR9 and CR11 will be picked up.

After the drilling head 14 has moved to a new position and the contacts FERa reclose, the column is again put in motion by momentary closure of the unit start switch US. This results in closure of the relay contacts CR7b and immediate energization of the forward solenoid FOR. Also, because the contacts CR9a are closed, closure of the contacts CR7b results in energization of the traverse solenoid TRA.

With such energization of both solenoids FOR and TRA, the column will begin its forward motion at a rapid traverse rate. Then, as shown in FIG. 4 for the motion program E4, when the valve 60 is actuated, the column will be decelerated to a slow traverse rate. It will continue at that rate until the limit switch LS22 is actuated.

Opening of the contacts LS22b will result in the dropout of the relay CR9 and opening of the contacts CR9a. Moreover, closure of the contacts LS22a will result in the control relay CR12 being energized through the now closed contacts Ac and the now closed contacts CR11a. When the limit switch LS22 is actuated, the relay CR12 is picked up to open the normally closed contacts CR12a, thus de-energizing the traverse solenoid TRA even though the contacts CR11b remain closed. Also, pick-up of the relay CR12 closes contacts CR12b to energize the high feed solenoid HF. Thus, when the limit switch LS22 is actuated, the rate of column movement is converted from slow traverse to high feed.

The column 11 continues to move at a high feed rate as it passes that position at which the limit switch LS23 is actuated. Then, when it reaches the position at which the limit switch LS25 is actuated, the contacts LS25a open to de-energize the control relay CR11. This results in opening of the contacts CR11a and CR11b, thereby de-energizing the relay CR12 and assuring that the traverse solenoid TRA remains de-energized even though the contacts CR12a reclose. Also, drop-out of the relay CR12a results in opening of the contacts CR12b so that the high feed solenoid HF is de-energized. Thus, when the column reaches that point at which the limit switch LS25 is de-energized, only the forward solenoid FOR remains energized. The column 11 moves at a slow feed rate until it reaches its full depth position at which the limit switch 24 is actuated.

The column then begins to retract and the tape reader is activated to read the next block of information as previously described.

Finally, if the fifth block of information read from the punched paper tape contains the motion program code E5, then this will result in the storage apparatus or relays A, B and C being set in that unique state with relays B and C picked up. When the column movement from its home position is initiated by closure of the unit start switch US and closure of the relay contacts CR7b, the FOR solenoid will be energized directly, and the TRA solenoid will be energized through the contacts CR10a (the relay CR10 having been energized through the normally closed contacts LS23b and the now closed contacts Ba). Thus the initial movement of the column is at a rapid traverse rate.

Then, as shown for the line E5 program in FIG. 4, when the column reaches that point at which the valve 60 is actuated, it will slow down to a slow traverse rate. Actuation of the limit switch LS22a will have no effect. Even though closure of the contacts LS22a completes an energization circuit for the control relay CR12 through the new closed contacts Bc and the now closed contacts CR11a, pick-up of the relay CR12 and opening of the contacts CR12a does not de-energize the traverse solenoid TRA because the contacts CR10a at this time remain closed.

Thus, while the relay CR12 is picked up and the contacts CR12b closed to energize the high feed solenoid HF when the limit switch LS22 is actuated, the traverse solenoid remains energized so that fluid by-passes both of the coarse and fine orifices 61 and 62 (FIG. 3).

When the column has advanced at slow traverse rate to the point at which LS23 is actuated, the contacts LS23b open to de-energize the relay CR10. Since the contacts CR10a now open and the contacts CR12a had previously opened, the traverse solenoid TRA is de-energized, thereby reseating the check valve 56 (FIG. 3). However, the contacts CR12b had previously closed so that the high feed solenoid HF is now energized, causing the valve 65 (FIG. 3) to create a by-pass path around the fine orifice 62. Accordingly, the column continues from the point at which the limit switch LS23 was actuated at its high feed rate.

When the limit switch LS25 is actuated, its contacts LS25a open to drop-out the relay CR11 (FIG. 7c). The contacts CR11a open, dropping out the relay CR12. The contacts CR12b open to de-energize the high feed solenoid HF. This leaves only the forward solenoid FOR energized, so that the column continues its final movement at slow feed rate. When the column reaches its final depth position, the limit switch LS24 is again actuated, causing the column to be rapidly retracted and the tape reader 31 to begin reading the next block of numerical information.

The foregoing cycles of operation repeat over and over for so long as information appears on the punched paper tape 24. It should be realized that the same motion program can be repeated for successive machining cycles without recoding that motion program in successive blocks of numerical information. If a block of information is read which contains no motion program code, i.e., an E line followed by a numerical line, then the setting of the storage apparatus, i.e., relays A, B and C, will remain unaffected.

It will be seen from the foregoing explanation that the present invention enables any one of a plurality of different traverse and feed programs to be preselected and effected by a movable machine tool member. While motion program codes in binary digital form on a record device may be sensed to preselect which motion program will be carried out, the apparatus and control circuits are relatively simple in their organization and operation. By the present arrangement, only a relatively few electrical devices, such as the solenoid valves 65 and 68 of FIG. 3, are employed to change the effective rate of movement of a machine tool member produced by power means, and only a few control elements or limit switches are employed. Yet, motion program codes are caused to so affect the storage apparatus that it renders different ones of the control elements or limit switches effective to produce different results as the column moves past different points in its travel. A very versatile and flexible system of rate programming has thus been realized.

I claim as my invention:

1. In a machine tool having a movable member and multi-speed power means for advancing said member along a predetermined path, a control system comprising, in combination, a first plurality of electrical devices, each associated with said power means and operative, when energized in different combinations, to cause such power means to move said member at different rates, a plurality of switching elements, means for actuating each of said elements when said member moves past respectively different points along its path, a reading device adapted to sense coded binary indicia on a record device which represents any one of a plurality of rate program codes, storage apparatus, means for setting said storage apparatus to a unique state in response to each rate program code sensed by said reading device, and means responsive to the state of said storage apparatus for causing the energized combination of said electrical devices to be controlled by respectively different ones of said switching elements.

2. In a machine tool having a movable member and multi-speed power means for advancing said member along a predetermined path, a control system for selectively determining the velocity of said member as it moves through different portions of said path, said system comprising in combination, a plurality of electrical devices each associated with said power means and operative, when energized in different combinations, to cause such power means to move said member at different rates, a plurality of switching elements, means for actuating each of said elements when said member moves past respectively different points along its path, a reading device for sensing recorded rate program codes, a plurality of relays and means for momentarily actuating the same in different combinations according to different rate codes sensed by said reading device, storage apparatus, decoding means responsive to energization of said relays in different combinations for setting said storage apparatus to a unique state for each of the possible program codes, and means responsive to the state of said storage apparatus for effectively connecting different combinations of said switching elements in controlling relationship with said electrical devices, so that actuation of said switching elements as said member advances causes the latter to have a particular rate program corresponding to the rate code read by said reader.

3. In a machine tool having a drilling head which is movable toward and away from a workpiece and hydraulic means for advancing and retracting said drilling head, a control system comprising, in combination, a plurality of solenoid valves each associated with said hydraulic means and operative, when energized in different combinations, to establish a different rate at which the head is advanced by said hydraulic means, a plurality of limit switches, means for actuating respective ones of said limit switches as said drilling head is advanced past predetermined points, a reading device adapted to sense coded binary indicia on a record which represents any one of a plurality of rate program codes, storage apparatus, means for setting said storage apparatus to a unique state in response to each rate program sensed by said reading device, a plurality of electrical contacts closed in different combinations when said storage apparatus is in different states, means connecting different ones of said contacts in circuits with respective ones of said limit switches, and means responsive to completion or interruption of said circuits for energizing different ones of said solenoid valves as said drilling head advances past said predetermined points.

4. In a machine tool having a member movable along a predetermined path, a control system comprising, in combination, a first solenoid and means responsive to its energization for advancing said member at a low feed rate, a second solenoid and means responsive to its energization jointly with said first solenoid for advancing said member at a high feed rate, a third solenoid and means responsive to its energization jointly with said first solenoid for advancing said member at a traverse rate, first, second and third limit switches, means for successively actuating said respective ones of limit switches as said member passes through three spaced points along its path, motion program code storage apparatus, means responsive to the sensing of any one of a plurality of program codes on a record for setting said storage apparatus to a corresponding one of a plurality of states, means governed by the state of said storage apparatus for effectively connecting different ones of said limit switches in controlling relation with said second and third solenoids, and means for energizing said first solenoid when the member is to be advanced, whereby the member may be made to move at rapid traverse, high feed or slow feed rates during intervals of its travel between different ones of said spaced points.

5. In a machine tool having a member movable cyclically along a predetermined path between two spaced end positions, the combination comprising a plurality of control elements disposed along said path, means for actuating each of said elements as the member passes a different point intermediate said end positions in its movement along said path, a plurality of means respectively responsive to the actuation of each of said elements for changing the rate at which said member is moved, storage means settable to a plurality of different states in response to electrical signals supplied thereto, and means for selectively disabling different ones of said rate changing means singly or in different combinations according to the state of said storage means to thereby selectively effect different programs of rates which are executed by said member as it moves through different portions of its path and without mechanically repositioning or effecting said elements or actuating means.

6. In a machine tool having a member movable cyclically along a predetermined path between two spaced end positions, the combination comprising multi-speed power means for advancing said member along said path, a plurality of electrical control elements disposed along said path, means for actuating each of said elements as said member passes a different point intermediate said end positions along said path, means including normally incomplete circuits respectively including said control elements for controlling said power means to change the velocity of said member in response to actuation of each of said elements, switching means for selectively completing different ones or different combinations of said circuits to thereby render certain ones or combinations of said velocity-changing means effective, and code storage means settable to any one of a plurality of states according to electrical code signals supplied thereto for controlling said switching means, whereby the velocity program of said member as it moves through different portions of said path on successive cycles is determined according to the state of said code storage means, and without mechanically positioning or adjusting said control elements or actuating means.

7. In a machine tool having a reciprocable column supporting a drilling spindle, a hydraulic actuator for advancing said column through a working stroke, and a plurality of solenoid valves and means connecting them in a hydraulic circuit with said actuator so that actuation of each valve makes said column move at a different rate, a control system comprising, in combination, a plurality of limit switches, means for actuating a different one of said limit switches as said column passes successive predeterminable points in its advancing movement, control means for selectively placing different ones of said limit switches in controlling relation with different ones of said solenoids so that said column selectively executes any one of a plurality of motion programs, and means responsive to different ones of a plurality of electrical signals for correspondingly conditioning said control means so that any of several different motion programs may be effected without physically adjusting or changing said limit switches or actuating means.

8. In a machine tool having a reciprocatable column supporting a drilling spindle, a hydraulic actuator for advancing said column through a working stroke, and a plurality of solenoid valves associated with said hydraulic actuator for controlling the rate at which the column is moved, a control system comprising, in combination, a plurality of limit switches, means for actuating a different one of said limit switches as said column passes successive predetermined points in its advancing movement, storage apparatus settable to any of a plurality of states, means responsive to each of a plurality of electrical code signals for setting said storage apparatus to a unique state corresponding to one of several desired rate programs, a plurality of contacts closed in different combinations when said storage apparatus is in its different states, and means responsive jointly to said contacts and to said limit switches for controlling the energization of said solenoid valves as said column passes different ones of said predetermined points, so that one of a plurality of programs of column motion corresponding to the received code signal is executed.

9. In a machine tool having a movable member and power means for advancing the same along a predetermined path, a control system comprising, in combination, a forward solenoid and means responsive to its energization to cause said power means to advance said member at a fine feed rate, a high feed solenoid and means responsive to its energization with said forward solenoid to cause said power means to advance said member at a high feed rate, a traverse solenoid and means responsive to its energization with said forward solenoid for causing said power means to advance said member at a traverse rate, first, second and third limit switches, one set of dogs for successively actuating said limit switches as said member advances through different points along its path, storage apparatus settable to a plurality of unique states for each of a plurality of rate programs, means responsive to each of a plurality of electrical code signals for setting said storage apparatus to a corresponding one of its states and means responsive to said storage apparatus when the latter is in each of its states for establishing different effective control interconnections between said three limit switches and said high feed and said traverse solenoids, so that different rate programs are effected in response to different code signals and without physical adjustment of elements or components.

References Cited in the file of this patent

UNITED STATES PATENTS

| 2,483,712 | Schafer | Oct. 4, 1949 |
| 2,684,017 | Schafer | July 20, 1954 |
| 2,838,963 | Good et al. | June 17, 1958 |

OTHER REFERENCES

"How Numbers Control," The Machinist Magazine, pp. 2196–2200, December 10, 1954. (Copy in Div. 58.)